April 7, 1959    E. J. LEHMAN    2,880,462
MOLD HAVING INSERT ANCHORING MEANS
Filed March 14, 1955    2 Sheets-Sheet 1
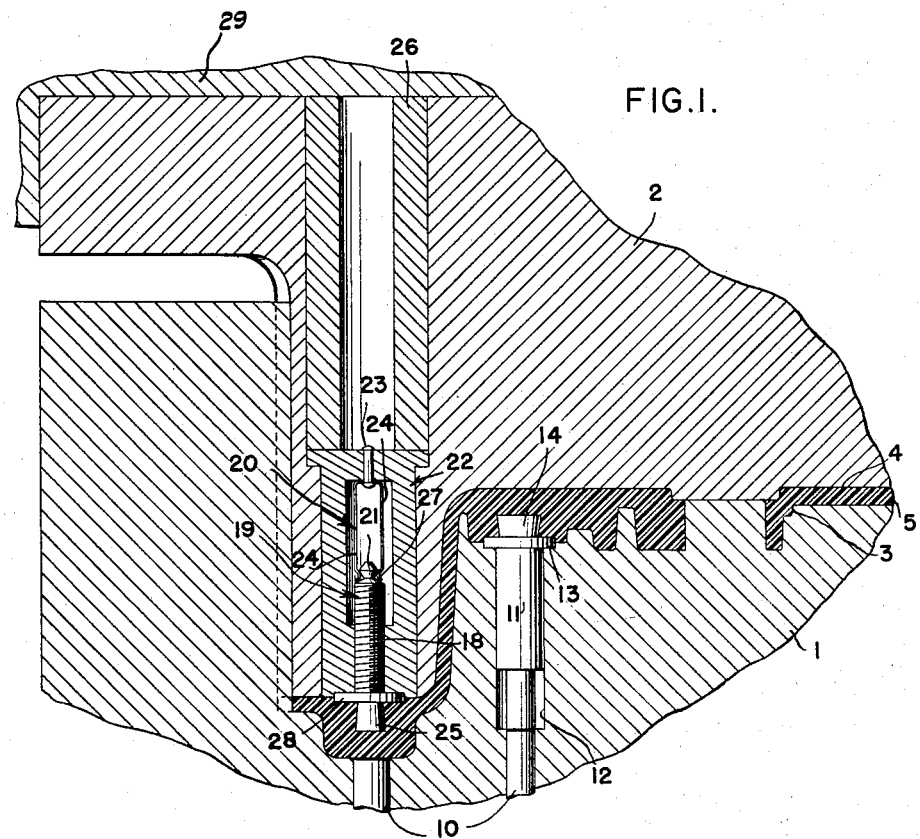
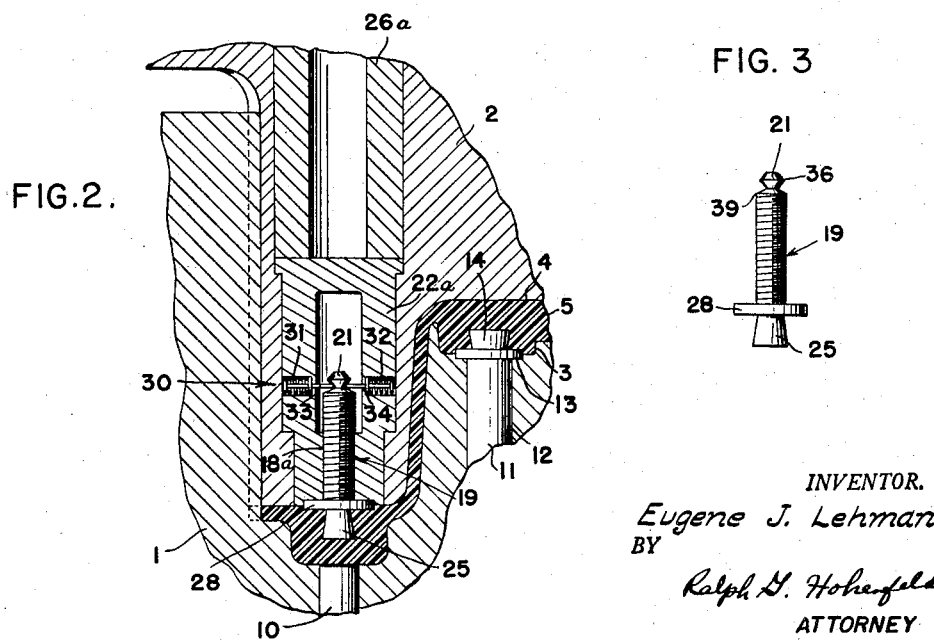
INVENTOR.
Eugene J. Lehman
BY
Ralph G. Hohenfeldt
ATTORNEY April 7, 1959   E. J. LEHMAN   2,880,462
MOLD HAVING INSERT ANCHORING MEANS
Filed March 14, 1955   2 Sheets-Sheet 2

INVENTOR.
Eugene J. Lehman
BY
Ralph G. Hohenfeldt
ATTORNEY

United States Patent Office 2,880,462
Patented Apr. 7, 1959

2,880,462

MOLD HAVING INSERT ANCHORING MEANS

Eugene J. Lehman, Zanesville, Ohio, assignor to McGraw-Edison Company, a corporation of Delaware Application March 14, 1955, Serial No. 494,107

2 Claims. (Cl. 18—36)

The present invention relates to the production of molded plastic bodies by any known method and it has particular relationship to an improved means of forming an insert so that it may be firmly anchored in a mold and accurately positioned in the final product. Practice of the invention is illustrated in conjunction with a transformer tap changer body where it is especially applicable although it will be found useful in molding any intricately shaped body having thin sections lying in different planes in which sections it is desired to embed metallic inserts.

It will appear in the specification that the invention is broadly applicable whether the upper or lower mold section moves during molding and whether such movement occurs in a horizontal, angular or vertical direction. It is also applicable when molding by other than the compression method. When molding thermosetting resinous materials by means of a vertical press, for example, a serious problem arises with respect to securely holding threaded inserts which are placed in the upper mold section because the inserts have a natural tendency to become dislodged and fall into the mold cavity. If the mold cavity is thin or shallow in the zone wherein the insert has fallen, it is obvious that the insert will be crushed by the high pressure developed when the mold sections meet. In this event, not only will the insert and molded piece be wasted, but costly permanent damage may result to the molds themselves.

A typical prior practice has been to set the inserts by pushing them into coil springs which are aligned coaxially with the respective insert sockets so that the convolutions of the springs coact like a thread with the thread of the insert, thereby holding the insert with a fair degree of certainty. After protracted use, however, reliability of this method may be greatly reduced because a poor fit is apt to develop due to wear and fatigue of the springs. This effect augments the danger of the insert dropping into the mold and also leads to increased spoilage of finished molded products because very often the plastic material, while in a fluid state during the molding period, will flow under shoulders on the insert and lift the latter from its socket, resulting in an inaccurately positioned insert.

Little trouble is experienced in anchoring the inserts in the stationary lower mold section because gravitational forces tend to assist maintaining the inserts firmly in their respective sockets. However, in certain cases the novel means disclosed hereinafter for anchoring inserts in mold sections are applicable to the stationary as well as the movable sections.

An object of the invention therefore is to overcome the above outlined problems through providing an accessory for molding plastics which facilitates the molding operation through enabling convenient and positive anchoring of inserts in the mold sections.

Another object is to modify conventional threaded inserts in a manner that facilitates their cooperation with novel means for anchoring them in mold sections and to utilize this modified form for endowing the insert with non-cross threading characteristics when coacting with a threaded nut during subsequent assembly of the molded parts with other parts.

Other objects and advantages of the invention will become apparent in the following detailed description taken in conjunction with the accompanying drawing in which:

Fig. 1 is a fragmentary elevational cross sectional view of a forming mold embodying one form of the invention;

Fig. 2 is a similar view showing an alternative form of the invention;

Fig. 3 is an elevational view of an insert designed according to the invention;

Figure 4:
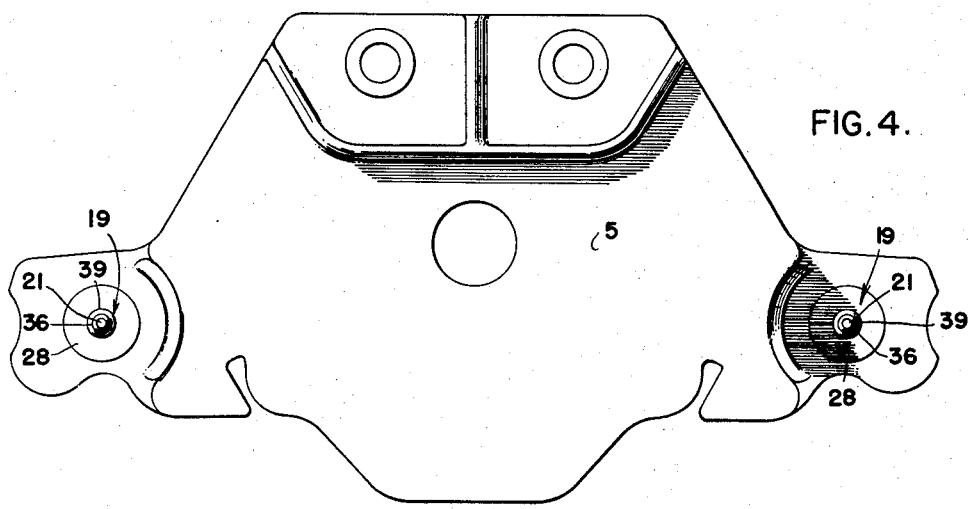
Fig. 4 is a plan view of a molded transformer tap changer body having metallic inserts positioned during molding by means of the invention.

For convenience in illustrating use of the novel insert retaining means it will be applied to molding a complex body of thermosetting material such as alkyd resin reinforced with random dispersed glass filaments. An arrangement for accomplishing this end is shown in Figs. 1 and 2 where details regarding the molding press have been omitted for the sake of clarity, it being assumed that those versed in the art may supply them.

In Fig. 1 is shown a pair of mold sections 1 and 2 adapted to be fixedly mounted on retainer shoes 29, only a fragment thereof being shown, and supported on the bed plate or platen of a conventional press, none of which are shown in full. The mold supporting retainer shoe 29 is, according to well established practice, provided with a suitable network of steam conducting passages (not shown) for heating it and mold sections 1 and 2 sufficiently to cause flow and curing of the plastic material during compression molding. Where reinforced alkyd resins are use, approximately 300 degrees F. is a suitable temperature for proper curing. A movable mold section 2 is disposed in alignment above section 1 and is carried rigidly on a platen (not shown) actuated by a vertically reciprocating ram capable of effecting pressures of approximately 1500 p.s.i. between mold sections 1 and 2 when they are brought together.

The configuration of the molded piece 5 is defined by a corresponding cavity created by means of removing metal by well known means from the mating surfaces 3 and 4 of mold sections 1 and 2 respectively. Hence, to mold piece 5, a carefully weighed nebulous mass of reinforced alkyd resin is deposited on the lower mold 1 while the upper mold 2 is separated therefrom and the latter is brought down under the pressure and temperature indicated above so that the mass will flow into every crevice in the mold cavity. Upon this event, the glass reinforcing fibers prevalent in molding compound tend to elongate into orientation with the direction of fluid flow, thereby attaining maximum strength characteristics in the finished product 5, shown in Fig. 4.

Heat developed by externally supplied steam combined with that incidental to exothermic polymerization of the alkyd resin effects complete solidification or curing of molded piece 5 in a matter of a few seconds to several minutes, depending upon the mold material, after molds 1 and 2 are closed under high pressure. After this lapse of time, molds 1 and 2 are separated in vertical spaced relationship and the finished product 5 ejected thereafter from mold 1 through the agency of a plurality of ejector or knockout pins 10 actuated vertically at the proper moment by well known means.

When it is desired that the lower side of piece 5, see

Fig. 1, be provided in final form with firmly embedded inserts 11 it is, of course, imperative that the inserts be deposited manually in suitable socket holes 12 to a depth limited by a shoulder 13. This type of insert ordinarily presents no problem in regard to shifting or loosening during molding because hole 12 may be bored for a rather close clearance with the shank of insert 11 for maintaining true alignment and because the insert is also held in place by the assistance of gravity. Hence, as long as resin in its fluid state cannot get under the shoulder 12 during molding, insert 11 will stay where placed and end 14 thereof will be irremovably embedded in molded piece 5. It is preferable to knurl or undercut end 14 as indicated in Fig. 1 so that it will not be as likely to pull out under load, especially when molding a resin which has little after-shrinkage.

Among the more serious problems, which this invention is dedicated to solve, is that of holding threaded inserts 19 in the upper mold section 2 while the latter is being lowered under high pressure into squeezing relation with lower mold 1. According to one form of the invention this is accomplished by means of a resilient metallic spring clip 20, Fig. 1, which grips the specially modified insert on a conical pilot portion 21. As will appear in detail hereinafter pilot 21 serves the multiple purposes of enabling gripping of the insert by spring clip 20, preventing cross threading and otherwise facilitating turning a nut onto insert 19.

Referring to Fig. 1 it will be noted that spring clip 20 is attached to the center of a cored shouldered plug 22 by means of a rivet 23 or other suitable means. Plug 22 extends downwardly toward molded product 5 and is held in upper movable mold section 2 by means of a steel back-up bushing 26.

Each free end of prongs 24 forming spring clip 20 is provided with an offset to define lips 27 which are adapted to positively latch or engage pilot portion 21 of threaded insert 19 when the latter is manually pressed into plug 22. The configuration of the lip-like ends 27 is such that one component of the radially inward force developed by the spring clip tends to exert a lifting effect on conical pilot 21, and accordingly, on shoulder 28 of the insert so that the shoulder prohibits entry of fluid plastic along the periphery of the insert when molds 1 and 2 are under pressure. Hence, it is seen that spring clip 20 securely engages insert 19 and accurately positions it longitudinally and laterally in closely fitting bore 18 of plug 22 so that the press operator may confidently expect the insert to remain intact when mold section 2 is brought down under pressure, thereby virtually eliminating the danger of mutilating the molds or spoiling the piece being molded. After piece 5 is fully cured as set out above, clips 20 are detached from conical portion 21 by merely separating the molds. Pins 10 then eject the finished piece.

An alternative means for retaining an insert 19 while molding an intricate shape having a variety of surfaces lying in vastly different horizontal planes is illustrated in Fig. 2 where the means are designated generally by the reference numeral 30. Here a bushing 26a holds down a retainer means carrying plug 22a which is modified in one respect from that represented by numeral 22 in Fig. 1 by being provided with a pair of cylindrical shouldered apertures 31. Coil springs 32 are disposed within apertures 31 for urging a pair of inwardly projecting detent pins against conical pilot portion 21 to thereby retain insert 19 as shown. A collar 34 formed integral with detents 33 serves to align the detents as they telescope within apertures 31, provides a surface against which coil springs 32 may react, and also acts as a stop for limiting the radially inward travel of the detents. Use of the invention in this form is convenient as that described hereinbefore, it merely being necessary to push an insert 19 into bore 18a until detents 33 grasp the insert adjacent its conical portion 21.

Figure 5:
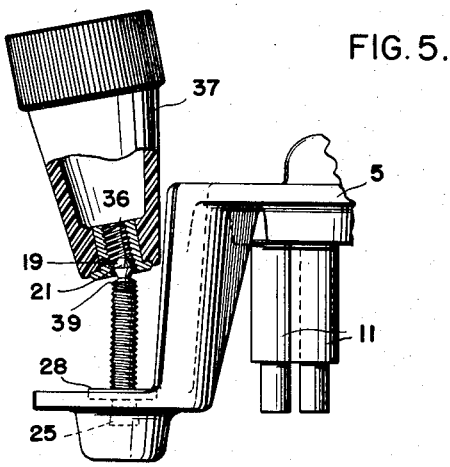
Fig. 5 represents a fragmentary part of a product molded according to the invention, partially assembled with another component.

Fig. 3 shows a detail view of an insert 19 made according to the invention. Attention is called to the character of conical pilot portion 21 which constitutes the guiding and anti-cross-threading feature of the novel insert. Note that pilot portion 21 is in fact defined by two cones adjoining at their bases to form a circumferential apex line 36. The diameter at line 36 is just slightly less than the minor diameter of the thread on insert 19 and the axial distance from line 36 to the beginning of said thread, designated by numeral 39, is preferably twice the thread pitch. In this form conical portion 21 may not only be engaged by retainers 20 or 30 during molding but has the additional characteristic of permitting an ordinary internally threaded nut or an elongated insulated nut 37, see Fig. 5, to be loosely deposited thereon by the assembler without the nut falling from insert 19. This is so because apex 36 of pilot 21 meshes with the internal thread on the nut when the latter is tilted with an inclination to fall from insert 19. The embedded end 25 of insert 19 is preferably knurled but it may be undercut as shown for the purpose increasing its holding capacity.

Note that the distance from apex line 36 to the beginning of the threads on insert 19, which beginning is designated by numeral 39, Fig. 3, is not necessarily critically limited to correspondence with twice the thread pitch. This distance may equal any reasonably large multiple of thread pitch or any fraction thereof. Nevertheless conical pilot 21 will be equally effective in guiding a coacting threaded member onto insert 19 and no less effective in temporarily holding a threaded member such as 37 in Fig. 5 when loosely deposited thereon.

Endowing an insert such as 19 with the characteristics described in the preceding paragraph results in great convenience while assembling en masse because the assembler may take a handful of nuts and deposit them loosely on inserts 19 and subsequently return to tighten all of them at one time. Moreover, by reason of apex 36 engaging one of the internal threads inwardly of the nut, little attention need be paid to preventing cross threading because that mishap is virtually impossible.

Summarily, it is seen that practice of the invention offers a convenient means for anchoring an insert in a mold and precludes the danger of dislodgement thereof during the molding operation, thereby avoiding mutilation of costly molds. In addition, the novel insert configuration contributes to easier assembly by reason of its nut retaining and anti-cross-threading characteristics.

Although only particular examples of the invention have been described it will be evident that it has various other applications and modifications. For this reason it is intended that the scope of the invention be limited only by the claims which follow.

It is claimed:

1. For retaining a mold insert having an annularly V-grooved end, the combination with separable molds each having adjacent faces conformed to define an enclosed mold cavity therebetween, which mold cavity has sections lying in completely different horizontal planes and a vertically disposed section connecting said horizontal sections, one of said horizontal sections being adapted to receive the end of said insert remote from said V-grooved end, one of said separable molds defining said one horizontal section being provided with an opening which surrounds the grooved end of said insert, the margin of said one mold defining said opening being provided with coaxial horizontal apertures having their axis perpendicular to the axis of said opening, detent pins extending from said apertures into compressive gripping relation with the grooved end of said insert, and resilient means biasing said detent pins against said grooved end, whereby said insert may be temporarily anchored in a predetermined position with reference to said mold cavity before and during a molding operation.

2. In a mold for producing a plastic product or the like, said mold comprising separable parts each having adjacent complementary surfaces conformed to define a mold cavity for a product that has sections lying in completely different horizontal planes that are connected by a vertical section, retainer means in one separable mold part for engaging a metallic insert which it is desired to embed in one horizontal mold section adjacent and in substantial parallelism with said vertical section, said retainer means including a plug means set in said one separable mold part adjacent said one horizontal mold section and also having an axis substantially parallel to said vertical section, said plug means also having a counterbored hole opening toward the said one horizontal mold section for receiving the free end of said insert, a U-shaped retainer clip affixed centrally within said counterbore and including spaced resilient prongs urged toward each other and having inwardly oppositely directed approximately V-shaped lips at their free ends positioned above the surface of said one mold part which defines the cavity for said one horizontal mold section, said lips defining a gap between them corresponding to the configuration of the free end of the insert, whereby a positive interlocking engagement between said lips and said insert may be effected.

References Cited in the file of this patent
UNITED STATES PATENTS

| | | |
|---|---|---|
| 447,775 | Higbee | Mar. 10, 1891 |
| 491,469 | Carver | Feb. 7, 1893 |
| 2,465,276 | Ryder | Mar. 22, 1949 |
| 2,564,029 | Peterson | Aug. 14, 1951 |
| 2,658,238 | Rizzo | Nov. 10, 1953 |
| 2,701,894 | Hammerly et al. | Feb. 15, 1955 |
| 2,770,013 | Crooker | Nov. 13, 1956 |